Figure 1:
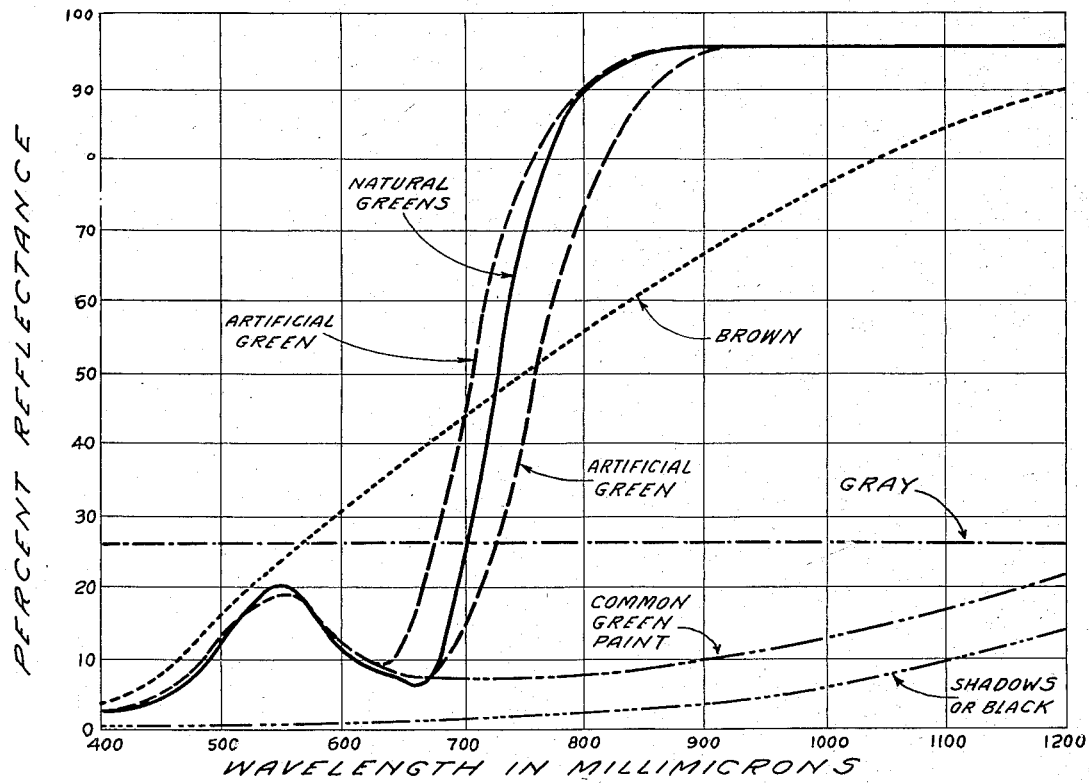

Feb. 13, 1945. W. A. SHURCLIFF 2,369,317

SPECTRAL SHIFT COLOR REPRODUCTION

Filed Feb. 19, 1942

INVENTOR.
WILLIAM A. SHURCLIFF,
BY Robert Ames Norton
ATTORNEY.

Patented Feb. 13, 1945

2,369,317

UNITED STATES PATENT OFFICE 2,369,317

SPECTRAL SHIFT COLOR REPRODUCTION

William A. Shurcliff, Plainfield, N. J., assignor to American Cyanamid Company, New York, N. Y., a corporation of Maine Application February 19, 1942, Serial No. 431,485

7 Claims. (Cl. 95—2)

This invention relates to spectrally rearranged reproduction methods of distinguishing between surfaces which differ spectrophotometrically but which show little or no color contrast to the eye from a distance.

The problem of distinguishing colors, particularly greens which appear to match visually is a matter of considerable practical importance. Probably the largest single field is military camouflage where various green colors have been used to simulate green foliage for the concealment of military objectives. Other fields of utility are for surveying and prospecting where certain types of trees, rock and soils have peculiar reflectance characteristics but do not present much contrast to ordinary visual observation. Another field is the analysis of materials which do not absorb selectively in the visual range but do have characteristic absorption in other ranges. The diagnosis in medicine where differences in absorption are not readily visible to the eye is a further field.

It has been proposed in the past to use infrared photography to detect military camouflage. The method can be used satisfactorily in the case of some of the earlier cruder forms of green color camouflage in which ordinary green pigments were used having low reflectance in the infrared whereas natural green foliage shows a high reflectance in the infrared. It has been proposed to use colors which have high infrared reflectance in order to defeat infrared photography and these attempts have been successful. If a perfect match for natural green is obtained, which is possible by use of the invention described and claimed in a copending application of Shurcliff and Stearns, Serial No. 406,012, filed August 8, 1941, and even imperfect matches can defeat infrared photography because it is only necessary to have high reflectance anywhere in the near infrared, the exact wave-length at which the reflectance starts is not significant. Moreover, an infrared photograph which is reproduced in black and white may not show very high contrast.

According to the present invention a plurality, preferably three, photographs are made simultaneously with sharp cutting filters, preferably passing narrow bands near 540 and 650 and 690 millimicrons. These color separation negatives are then used to produce color prints by the ordinary methods but instead of using complementary colors, the three primary colors, red, blue and yellow are combined so that objects showing strong reflectance at 540 millimicrons will appear red. Those showing high reflectance at 650 will appear blue and those showing high reflectance at 690 will appear yellow. As a result natural greens which have a high reflectance in the red will appear yellow, ordinary green paints will appear red and those with high reflectance at 650 will appear bluish red and those with low reflectance at 690, yellowish red. Grays will be gray, browns will be green, and blacks or shadows will be black. It is thus possible to use the psychologically effective method of color to distinguish between shades of green which are a good match by visual observation or even those which may have a sufficiently high infrared reflectance to defy detection by infrared photography. The balance of the landscape is not upset, shadows instead of interfering, show up naturally black and the high degree of color contrast is obtained simply and easily.

Of course, the present invention will not distinguish between natural green and an artificial green which is a perfect spectrophotometric match such as some of those described in the copending application above referred to, but it is possible by means of the present invention to distinguish between colors which are fairly good matches for the natural greens and would defy detection by infrared photography. Also the detection is much more striking and sharp because the contrast in color is much more apparent to the eye than the contrast in an infrared photograph where the differences may be due in part to shadows or darker or lighter green pigments rather than to differences indicative of different types of pigments.

Figure 2:
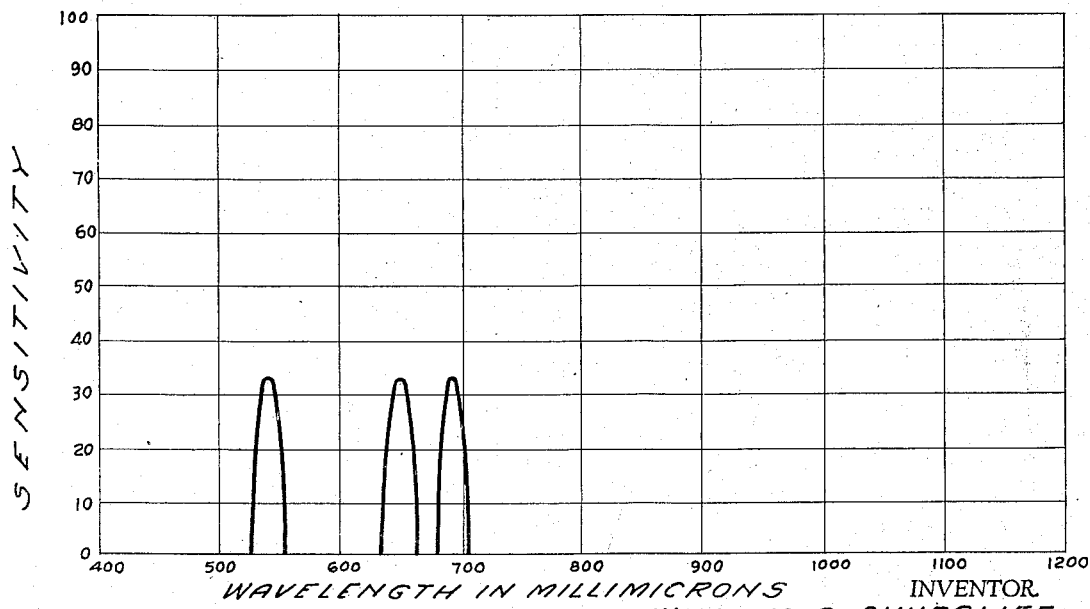

The invention will be described in greater detail in conjunction with a specific modification for which the spectrophotometric curves appear in the drawing in which:

Fig. 1 is a series of photomertic curves of reflectance of a number of colored materials; and Fig. 2 is a series of spectrophotometric curves of the overall photographic sensitivity of three filters and the film.

When using the spectral shift shown in Figs. 1 and 2, it will be noted that two of the filters, namely those having transmission peaks at about 690 and 650 millimicrons occur close to the point where the steep rise of the curve for natural greens occurs. Chlorophyl will show good reflectance at 540 and 690 millimicrons but will exhibit a low point near 650 millimicrons. Accordingly it will appear as yellow. A green color to which sufficient infrared reflection has been imparted but which is low at 690 will obviously be a yellowish red whereas one which is high at 650 will be a bluish red.

The choice of filters is illustrated for the purpose of distinguishing most sharply between greens of natural and artificial origin where a very steep rise in photometric curve takes place at about 690 millimicrons. If the process is to be applied for detecting small differences between other colored surfaces which have a steep rise or fall in reflectance at other wavelengths the particular filter bands should be shifted so that one coincides with the sharp rise or fall and another is closely adjacent thereto. The exact spectral location of the sharp cutting filters will be determined therefore by the types of spectral reflectance characteristics which are to be most sharply distinguished.

The arrangement of the primary colors in the final color print has been chosen for maximum contrast but they may be shifted in other ways within the scope of the invention.

The present invention is particularly important for three color photographic processes. It is, however, applicable to other photometric or photographic processes such as for example three color television in which the television camera takes the place of the camera producing the separation negatives. It is also possible to employ a spectral rearrangement in visual observation involving ultraviolet or short wavelength visual range illumination by utilizing a spinning sector disc containing the three filters backed with fluorescent samples fluorescing with the required different visual colors. Instantaneous observation is thereby made possible but the apparatus is necessarily somewhat more complicated than is a camera, and where time is not of the essence, the photographic result will frequently be sharper and clearer, and constitutes the most important and preferred field for the present invention. The photographic modification is also less restricted in the type of illumination required.

I claim:

1. A method of distinguishing colors showing little or no color contrast to the eye from a distance but having spectrophotometric curves with steep reflectance increases in different portions of the spectrum, which comprises causing radiation from the whole area of the material to be examined to pass through a plurality of sharpcutting narrow band pass filters, one of which has a peak transmission in the range of the wave length of the steep reflectance increase of one of the colors and another at a wave length different thereto, at which wave length the said color does not have a steep reflectance increase, and causing the light passing through the filters to be focussed into images on photosensitive material and transforming the images into visually observable images in contrasting colors contrasting to the colors of the filters and their complementary colors.

2. A method according to claim 1 in which the two filters pass bands at about 690 and 650 millimicrons.

3. A photographic method for distinguishing between colors showing a close visual match to the eye but having spectrophotometric curves with steep reflectance increases in different portions of the spectrum, which comprises causing light from the whole area of the material to be examined to pass through a plurality of sharpcutting narrow band pass filters, one of which has a peak transmission in the range of the wave length of the steep reflectance increase of one of the colors and another at wave length at which the said color does not have a steep reflectance increase, and causing the light passing through the filters to be focussed into colored images on a material carrying a photographic emulsion and transforming the images into images in contrasting colors contrasting to the colors to the filters and to their complementary colors.

4. A method of three color photography for the distinction of colors showing a close visual match but having spectrophotometric curves with steep reflectance increases in different portions of the spectrum, which comprises taking color separation negatives of the whole area of material to be examined through sharpcutting narrow band pass filters, one of which has a peak transmission in the range of the wave length of the steep reflectance increase on the spectrophotometric curve of one of the colors, the second filter having a peak transmission at a wave length different thereto, at which wave length the color does not show a steep reflectance increase, and a third filter having a peak transmission at another portion of a visible spectrum, reproducing from the separation negatives in contrasting colors contrasting to the colors of the filters and their complementary colors whereby a spectral rearrangement of the colors is obtained.

5. A method according to claim 4 for distinguishing between natural green foliage having a steep increase in reflectance at about 690 millimicrons from other green colors in which the one filter gives a sharp band pass at 690 millimicrons, another filter at 650 millimicrons and a third at about 540 millimicrons and printing the positive images from the 690 millimicrons filter in blue, the 650 millimicron in yellow and the 540 millimicron in red.

6. A method for instantaneously distinguishing between surfaces having colors which are a close visual match but having curves with steep reflectance increases in different portion of the short wave spectrum which comprises causing short wave radiation from the whole area of the material to pass through a plurality of sharpcutting narrow band pass filters, one of which has a peak transmission in the range of the wave length of steep reflectance increase of one of the colors and the other at a wave length different thereto, at which wave length the color does not have a steep reflectance increase, and causing the radiation passing through the filters to be focussed to form images on fluorescent materials in contrasting colors, contrasting to the colors of the filters and their complementary colors, the images being fused into a single visual image.

7. A method according to claim 6 in which the filter and fluorescent material combinations are successively interposed into radiation at a rate faster than the persistence of vision.

WILLIAM A. SHURCLIFF.